United States Patent [19]
Anderson

[11] Patent Number: 6,122,003
[45] Date of Patent: *Sep. 19, 2000

[54] METHOD AND APPARATUS FOR CHANGING OPERATING MODES OF AN IMAGE CAPTURE DEVICE

[75] Inventor: Eric C. Anderson, San Jose, Calif.

[73] Assignee: FlashPoint Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/916,368

[22] Filed: Aug. 22, 1997

[51] Int. Cl.[7] .................................................. H04N 5/225
[52] U.S. Cl. .......................................... 348/207; 348/333
[58] Field of Search .................................... 348/367, 333, 348/373, 375, 376, 207, 231, 233; 386/118; H04N 5/225

[56] References Cited

U.S. PATENT DOCUMENTS

| | | | |
|---|---|---|---|
| 4,456,931 | 6/1984 | Toyoda et al. | 348/233 |
| 4,982,291 | 1/1991 | Kurahashi et al. | 386/118 |
| 5,138,460 | 8/1992 | Egawa | 348/239 |
| 5,237,648 | 8/1993 | Mills et al. | 395/133 |
| 5,274,458 | 12/1993 | Kondo et al. | 348/222 |
| 5,465,133 | 11/1995 | Aoki et al. | 348/363 |
| 5,497,193 | 3/1996 | Mitsuhashi et al. | 348/231 |
| 5,513,306 | 4/1996 | Mills et al. | 395/148 |
| 5,845,166 | 1/1998 | Fellegara et al. | 348/64 |
| 5,861,918 | 1/1999 | Anderson et al. | 348/233 |

FOREIGN PATENT DOCUMENTS

| | | | |
|---|---|---|---|
| 8032847 | 2/1996 | Japan | H04N 5/225 |
| 8116476 | 5/1996 | Japan | H04N 5/225 |
| 8205014 | 8/1996 | Japan | H04N 5/225 |
| 8223524 | 8/1996 | Japan | H04N 5/225 |

*Primary Examiner*—Wendy Garber
*Assistant Examiner*—Aung S. Moe
*Attorney, Agent, or Firm*—Sawyer Law Group LLP

[57] ABSTRACT

A method and apparatus for changing operating modes in an image capture device. The image capture device includes a shutter button, a first operating mode for capturing images, and a second operating mode for displaying the captured images on a display device. The method and apparatus include providing the image capture device with two sets of navigational control buttons, wherein a direction of image scrolling on the display in the second operating mode is mapped to the first set of navigational control buttons. The method and apparatus further include switching between the operating modes of the image capture device using the second set of navigational control buttons, whereby a user may change operating modes with the same mechanism that is used for image scrolling.

In a further embodiment of the present invention, the π method and apparatus include providing the image capture device with a third operating mode and automatically switching from either the second or third operating modes to the first operating mode by pressing the shutter button, thereby allowing a user to capture an image from any of the operating modes.

11 Claims, 8 Drawing Sheets

METHOD AND APPARATUS FOR CHANGING OPERATING MODES OF AN IMAGE CAPTURE DEVICE

FIELD OF THE INVENTION

The present invention relates generally to image capture devices, including digital cameras, and more particularly to a method and apparatus for changing operating modes of an image capture device.

BACKGROUND OF THE INVENTION

Most digital cameras today are similar in size to and behave like conventional point-and-shoot cameras. Unlike conventional cameras, however, most digital cameras store digital images in an internal flash memory or on external memory cards. Some digital cameras are also equipped with a liquid-crystal display (LCD) or other type of display screen on the back of the camera. Through the use of the LCD, most digital cameras operate in two modes, record and play, although some cameras only have a record mode. In record mode, the LCD is used as a viewfinder in which the user may view an object or scene before taking a picture. In play mode, the LCD is used a playback screen for allowing the user to review previously captured images either individually or in arrays of four, nine, or sixteen images.

Besides the LCD, digital camera user interfaces also include a number of buttons or switches for setting the camera into one of the two modes and for navigating between images in play mode. Representative cameras of this type are the QV series by Casio Inc., of Dover, N.J. The QV series typically includes two navigation buttons labeled "−" and "+", a mode button, a display button, a zoom button and a delete button. Play mode for a QV camera begins with a default screen displaying a full-sized individual image. Other images stored in the camera may then be displayed in a backward or forward sequence by pressing the "−" and "+"navigation buttons, respectively. Pressing the "mode" button during play mode causes four images to be displayed on the LCD in a 2×2 array, and pressing the "mode" button again causes nine images to be displayed in a 3×3 array. The user can then "page" through screens of image arrays by pressing the navigation buttons, or the user can move from image to image in the arrays by first pressing the display button and then traversing across the images in the rows of the arrays using the navigation buttons. The user may have the full-sized image displayed of a chosen image by pressing a "zoom" button or can delete the image by pressing a "delete" button. When the camera is operating in play mode and the user wants to capture an image, the user must first return the camera to record mode by pressing the "mode" button again.

The DSC-F1 digital camera by Sony Electronics Inc., San Jose, Calif., has a more complicated user interface and method for changing operating modes. FIG. 1A is a right-rear view of the DSC-F1, and FIG. 1B is a left-rear view of the DSC-F1. The DSC-F1 includes a Power/Function dial 12 for switching between play and record mode, and a Menu/Execute jog dial 14 for displaying menus and selecting items. The user can change from record mode to play mode by pressing a lock button 13 in the center of the dial 14 while rotating the Power/Function dial 12 to the "Play" setting. Once in play mode, the user and may then scroll through full-sized images on the display using the scroll buttons 16. Most camera functions are controlled through menu screens, which are accessed through either the Power/Function dial 12 or the Menu/Execute jog dial 14.

One disadvantage of two mode digital cameras, such as the ones described above, is that since the cameras only have two modes, many of the camera features must be accessed through multiple levels of menus and/or navigation screens, which is inconvenient for the user. For instance, in the DSC-F1, play mode functions are controlled through a play menu, which is accessed by pressing the Menu/Execute jog dial 14, as shown in FIG. 1B. Once a list of menu items is displayed, the user can turn the Menu/Execute jog dial 14 to move a cursor up and down the list. Pressing the Menu/Execute jog dial 14 while the cursor is over a selected function then executes that function. One function that may be selected is a search function, which displays nine images on the display in a 3×3 array and allows the user to scroll backwards and forwards through the images by turning the Menu/Execute jog dial 14 accordingly.

Like the digital cameras described above, most digital cameras suffer the disadvantage of forcing the user to change the operating mode of the camera from play mode to record mode before being able to capture another image. In cameras such as DSC-F1, this can be a cumbersome event, since the user must press the lock button 13 while simultaneously rotating the Power/Function dial 12 to the proper setting. Assuming the image the user wanted to capture was fleeting, by the time the user located the Power/Function dial 12, pressed the lock button 13, and rotated the dial 12, the object the user wanted to capture may have passed.

One way to make the camera user interface less cumbersome and to simplify the method of changing operating modes is to provide additional hardware buttons on the camera interface which correspond to each mode. But as seen in FIGS. 1A and 1B, adding too many buttons to the user interface may complicate the operability of the camera since it forces the user to memorize too many button functions and/or key sequences. Another disadvantage of adding too many buttons to the user interface is that each additional button increases the overall cost of the camera.

What is needed therefore, is an improved method and apparatus for changing the operating modes of an image capture device. The present invention addresses such a need.

SUMMARY OF THE INVENTION

The present invention provides a method and apparatus for changing operating modes in an image capture device. The image capture device includes a shutter button, a first operating mode for capturing images, and a second operating mode for displaying the captured images on a display device. The method and apparatus include providing the image capture device with two sets of navigational control buttons, wherein a direction of image scrolling on the display in the second operating mode is mapped to the first set of navigational control buttons. The method and apparatus further include switching between the operating modes of the image capture device using the second set of navigational control buttons, whereby a user may change operating modes with the same mechanism that is used for image scrolling.

In a further embodiment of the present invention, the method and apparatus include providing the image capture device with a third operating mode and automatically switching from either the second or third operating modes to the first operating mode by pressing the shutter button, thereby allowing a user to capture an image from any of the operating modes.

Accordingly, the method for changing operating modes of the present invention makes mode changes less cumbersome, reduces button clutter on the user interface, and reduces the amount of key sequences the user must memorize in order to effectively operate the digital camera.

DETAILED DESCRIPTION OF THE INVENTION

The present invention relates to an improved method and apparatus for changing operating modes of an image capture device. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons and/or other items, could incorporate the features described herein below and that device would be within the spirit and scope of the present invention. Thus, the present invention is not intended to be limited to the embodiment shown but is to be accorded the widest scope consistent with the principles and features described herein.

The present invention is a method and apparatus for changing operating modes of an image capture device which make mode changes less cumbersome, reduce button clutter on the user interface, and reduce the amount of key sequences the user must memorize in order to effectively operate the digital camera.

Figure 1A:
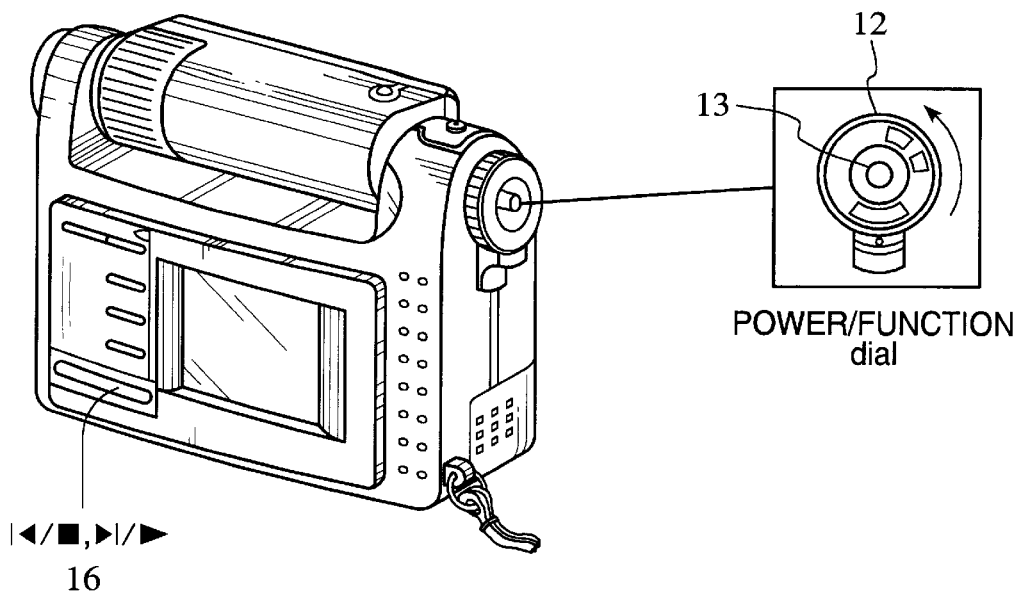
FIGS. 1A and 1B are block diagrams of a conventional digital camera.
Figure 1B:
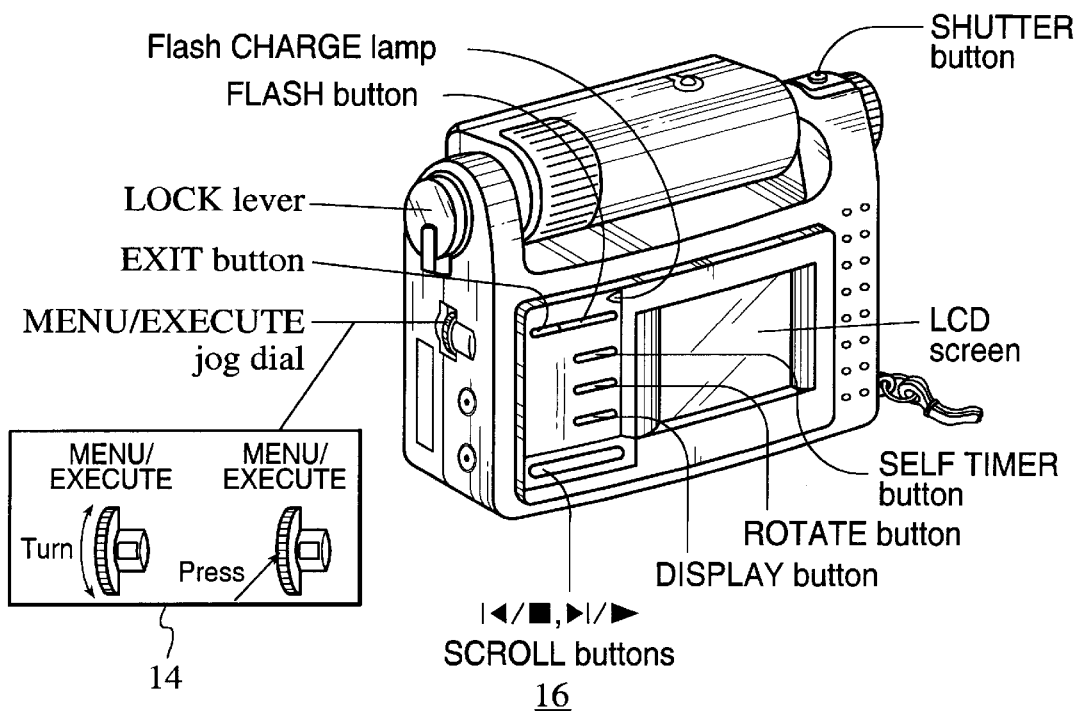
Figure 2:
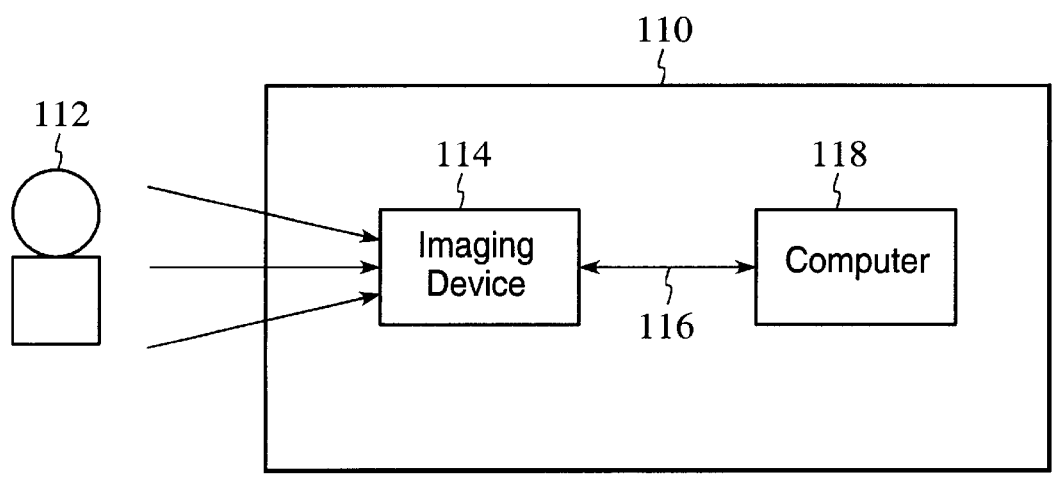
FIG. 2 is a block diagram of a digital camera that operates in accordance with the present invention.

Referring now to FIG. 2, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 3:
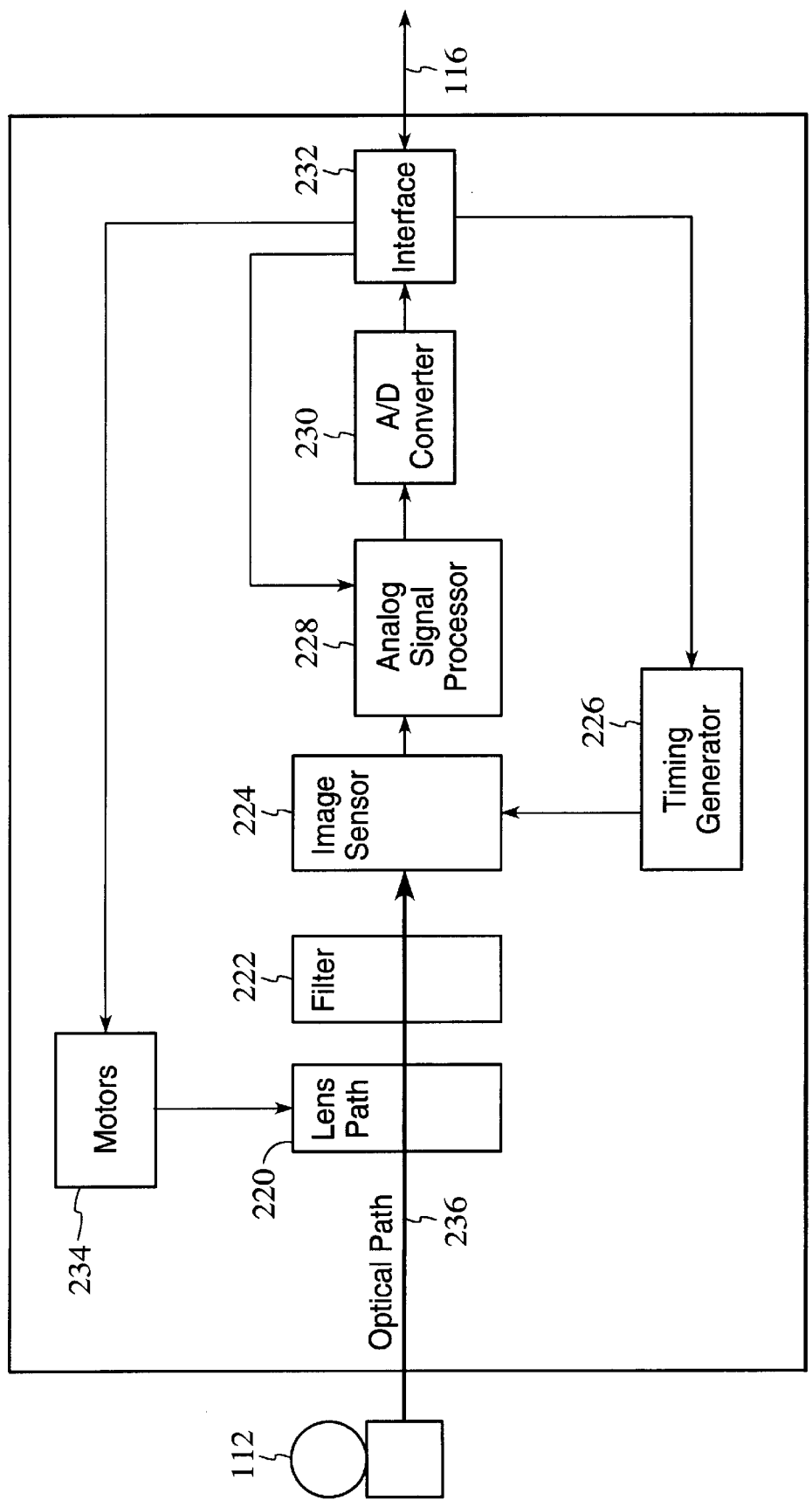
FIG. 3 is a block diagram of one preferred embodiment for the imaging device of FIG. 2.

Referring now to FIG. 3, a block diagram of one preferred embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 4:
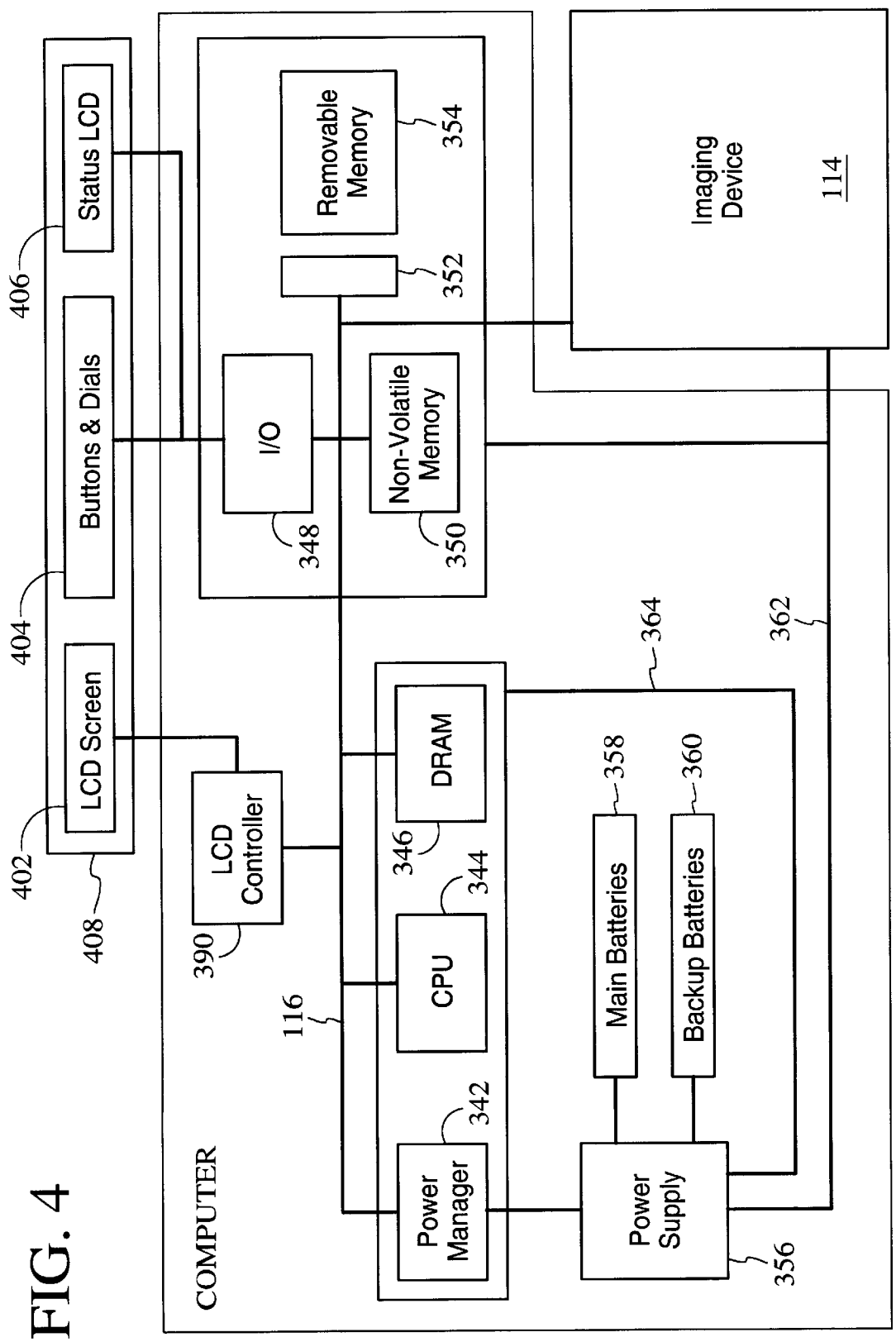
FIG. 4 is a block diagram of one preferred embodiment for the computer of FIG. 2.

Referring now to FIG. 4, a block diagram of one preferred embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 5:
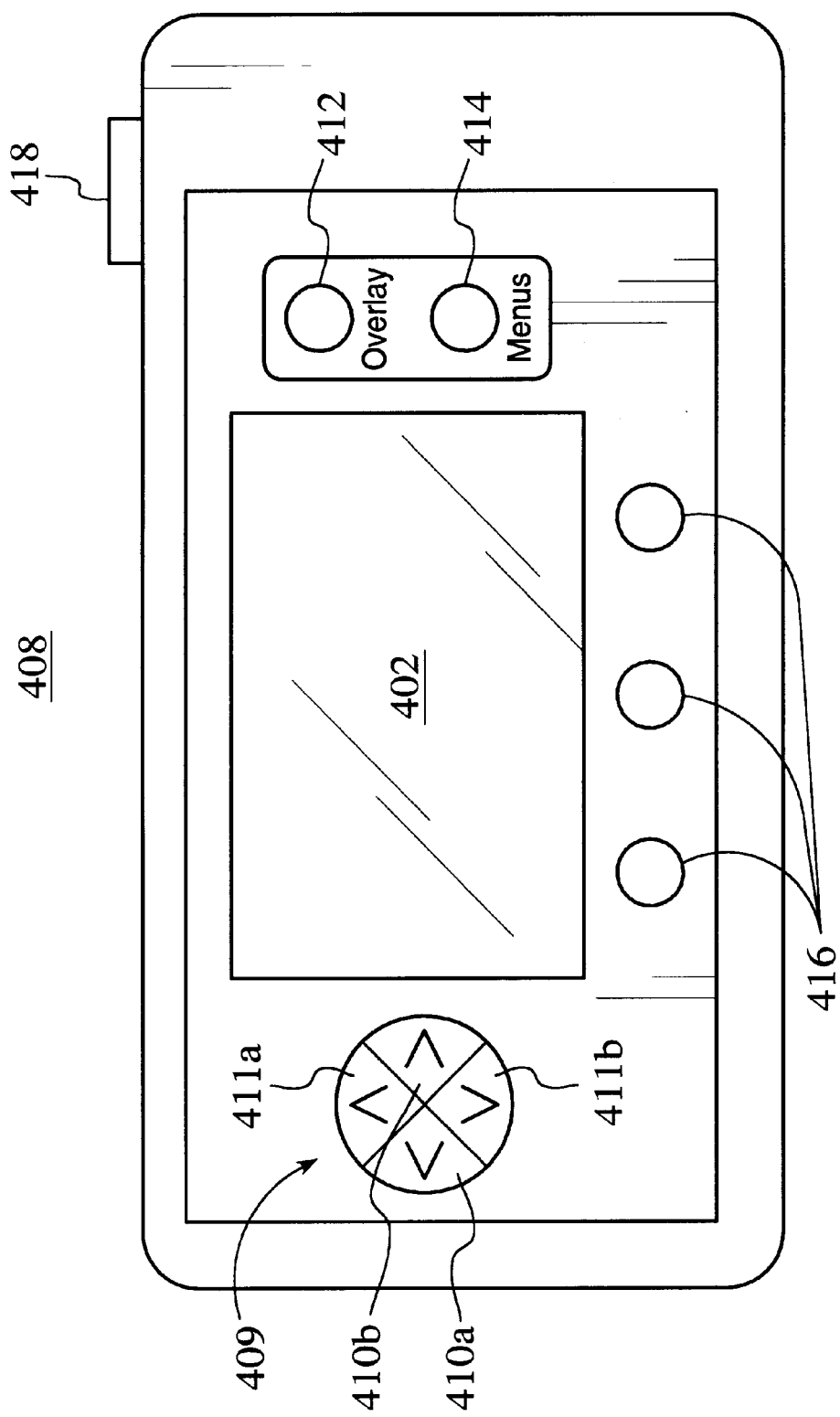
FIG. 5 is a diagram illustrating a back view of a camera which operates in accordance with the present invention.

Referring now to FIG. 5, a back view of the camera 110 is shown, which includes the LCD screen 402, a four-way navigation control button 409, and a shutter button 418. In a preferred embodiment of the present invention, the four-way navigation control button 409 provides the user interface with four buttons; left/right buttons 410a nd 410b, which have a horizontal orientation, and up/down buttons 411 a and 411b, which have a vertical orientation. The camera may optionally include other buttons, such as an overlay button 412, a menu button 414, and a set of programmable soft keys 416.

In one aspect of the present invention, the digital camera is provided with several different operating modes for supporting various camera functions. Although the digital camera includes multiple operating modes, the modes relevant to this description are capture (record) mode, review mode, and play mode.

In capture mode, the camera 110 supports the actions of preparing to capture an image, and capturing an image through the use of either the LCD screen 402 alone or with the aid of an optional optical viewfinder (not shown). In review mode, the camera 100 supports the actions of reviewing camera contents, editing and sorting images, and printing and transferring images. In play mode, the camera 100 allows the user to view screen-sized images in the LCD screen 402. In alternate embodiments, play mode may also allow the user to hear recorded sound associated to a displayed image, and to play back sequential groupings of images, which may comprise time lapse, slide show, and burst image images.

When the camera is placed into a particular mode, that mode's default screen appears in the LCD screen 402 in which a set of mode-specific items, such as images, icons, and text, are displayed. Through the use of multiple operating modes, the camera functions and features can be categorized, which allows for faster access to those features and functions than would be possible by nesting all the features in one play mode as in conventional digital cameras.

Figure 6:
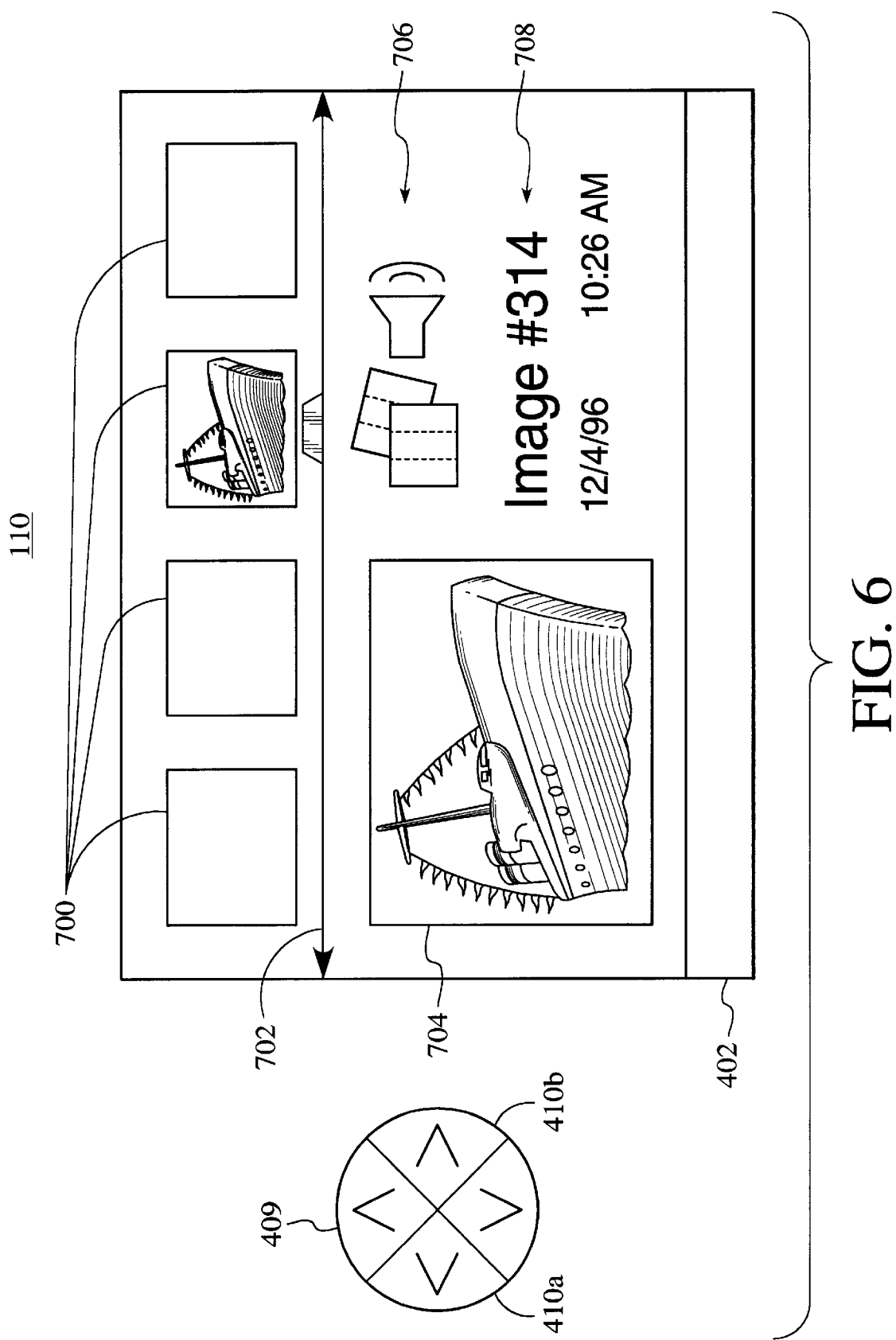
FIG. 6 is a diagram illustrating the operation and appearance of the user interface when the camera is placed into review mode.

Referring now to FIG. 6, a diagram illustrating the operation and appearance of the user interface when the camera is placed into review mode is shown in accordance with a preferred embodiment of the present invention. The review mode enables the user to view all the images in the camera along with specific attributes associated with each of the images.

The review screen layout is based on a filmstrip metaphor which allows users to quickly move forward and backward among pictures chronologically. In a preferred embodiment, several small-sized versions of the captured images, called thumbnails 700, are displayed in a row across the LCD screen 402. The user may scroll through the series of displayed thumbnails 700 in the LCD screen 402 using the four-way navigation control button 409. In a preferred embodiment, the direction of scrolling is mapped to the horizontal left/right buttons 410a and 410b. When the user holds down the left/right buttons 410, the thumbnails 700 are scrolled-off the LCD screen 402 and replaced by new thumbnails 700 representing other captured images.

A stationary selection arrow line 702 is used as both a navigational aid and to indicate which thumbnail is the currently selected image. When there are more than four images in the camera, the selection arrow line 702 displays arrow heads to indicate movement in that direction is possible with the left/right navigation buttons 410. As the user presses the navigation buttons 410 and the thumbnails 700 scroll across the LCD screen 402, the thumbnail 700 that is positioned over a notch in the selection arrow line 702 is considered the selected image.

When a thumbnail 700 becomes the selected image, additional information corresponding to that image is automatically displayed. In a preferred embodiment, the additional information includes a large thumbnail 704 showing a larger view of the selected thumbnail, and image information comprising an icon bar 706 and text 708. The icon bar may display several icons indicating the media types associated with the active image, such as whether the image is a still, a time lapse, or a burst image, whether sound is attached to the image, and a category for the image. The displayed text 708 may include a specification of the name or number of the image, and the date and time the image was captured.

Figure 7:
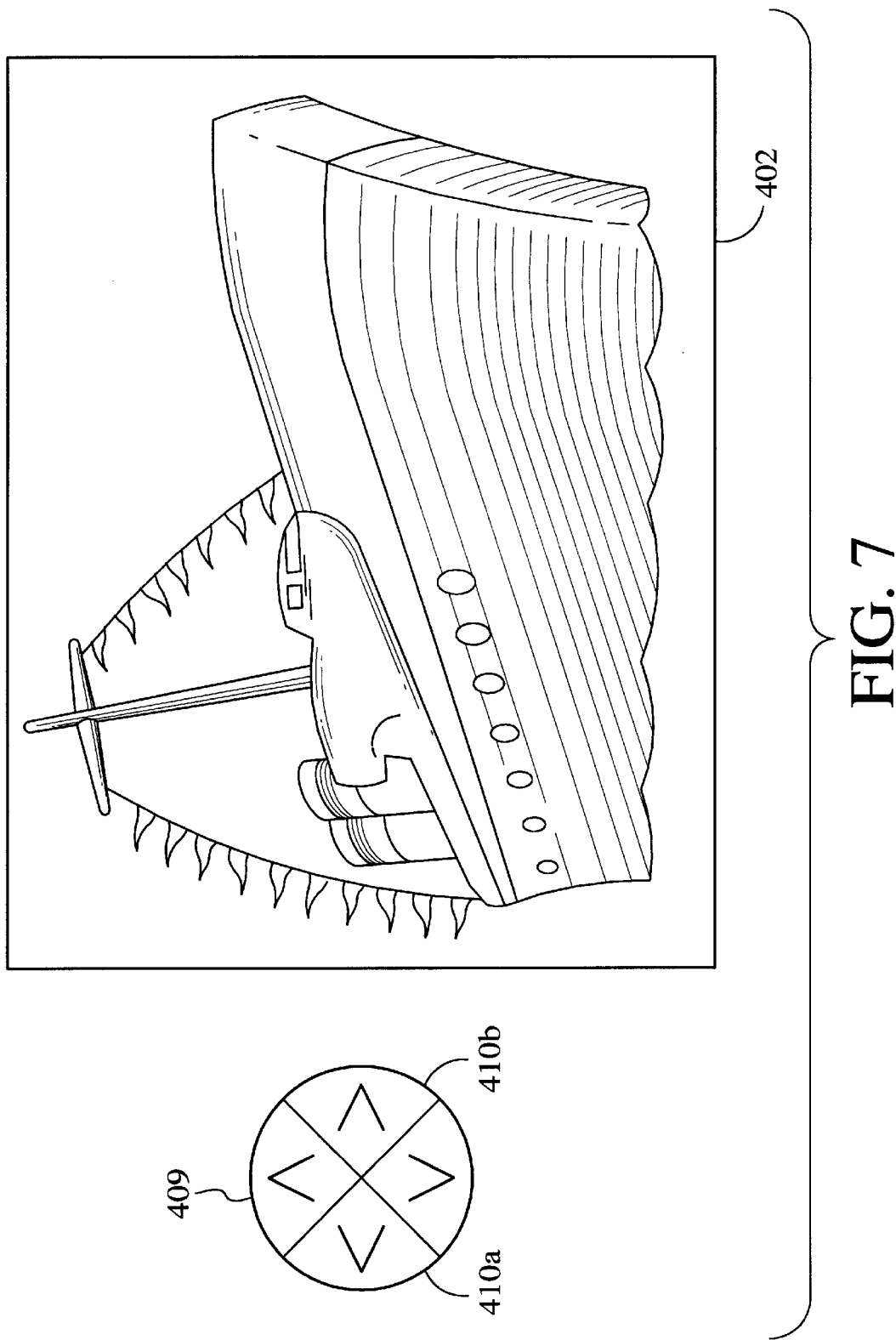
FIG. 7 is a diagram illustrating the operation and appearance of the user interface when the camera is placed into play mode.

Referring now to FIG. 7, a diagram illustrating the operation and appearance of the user interface is shown when the camera is placed into play mode in accordance with a preferred embodiment of the present invention. Placing the camera into play mode enables the user to view full-sized images and to play-back various media types associated with the images. In a preferred embodiment, the play screen layout displays one full-sized image at a time in the orientation that the image was captured. As in the review mode, the user may chronologically scroll through the full-sized images in the LCD screen 402 using the left/right buttons 410 on four-way navigation control button 409. Users can also play back various media types, such as time lapse, bursts and slide show images according to either default or user defined play back rates.

In conventional digital cameras, the user typically switches between the various operating modes (capture and play) of the camera using a mode dial or mode button. As stated above, this method of changing modes may be cumbersome especially since the user must change from play mode to record mode before being able to capture another image.

The present invention provides a method and apparatus for changing the operating mode of a digital camera which make use of existing buttons on the user interface and thereby eliminates the need to have a mode dial. More particularly, the present invention, allows the user to change operating modes using the four-way controller 409, which is same mechanism that is used for image scrolling.

In a first embodiment, when the present invention is used with a camera having three modes (capture, review, and play) the user can access any operating mode from any other operating mode with one press of the vertical navigation buttons 411*a* and 411*b*. In a second embodiment, the user may capture an image from any operating mode by pressing the shutter button 418, which causes the camera to automatically switch to capture mode.

Figure 8:
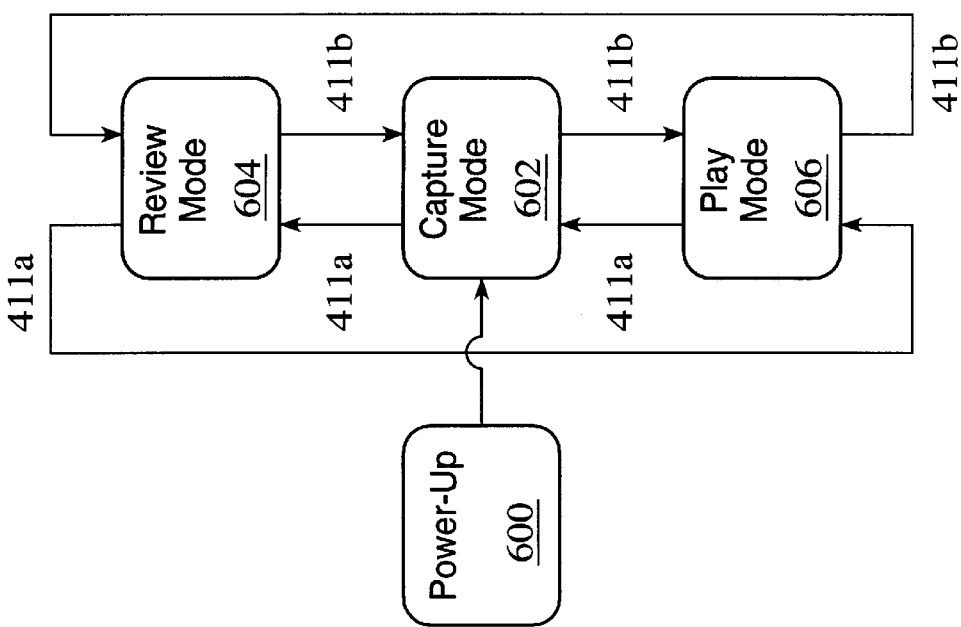
FIG. 8 is a state diagram of a method for changing operating modes of a digital camera in accordance with a first embodiment of the present invention.

Referring now to FIG. 8, a state diagram of the process of changing operating modes of a digital camera in accordance with a first embodiment of the present invention is shown. As stated above, the camera preferably includes a review mode 604, a capture mode 602, and a play mode 606. However, a digital camera operating in accordance with the present invention may include any number of modes.

Referring to both FIGS. 5 and 8, when the camera is initially powered in block 600, the camera defaults to the capture mode 602. Thereafter, pressing the up button 411*a* on the four-way controller 409 causes the camera to switch to review mode 604, and pressing the down button 411*b* causes the camera to switch to play mode 606. Once in review mode 604, pressing the up button 411 a on the four-way controller 409 causes the camera to switch to play mode 606, and pressing the down button 411*b* causes the camera to return to capture mode 602. When the camera is in play mode 606, pressing the up button 411*a* on the four-way controller 409 causes the camera to switch to capture mode 604, and pressing the down button 411*b* causes the camera to switch to play mode 606.

According to the present invention, since the user uses the same mechanism for both image scrolling and mode changes, the user can more quickly and intuitively change from one mode to the next.

Although the above method of using the four-way controller 409 to change operating modes allows a user to change modes more conveniently than prior methods which require the user to turn a separate mode knob or to press a mode dial, the user must still return to the capture mode from the play and review modes in order to capture an image. In the case where the camera is in play mode or review mode and the user wishes to capture a fleeting image, the user must therefore press either the up or down button at least once to return to capture mode, and then press the shutter button to capture the image.

According to the second embodiment of the present invention, the need to have the user switch the camera from play or review mode to capture mode in order to capture an image is eliminated. In the second embodiment of the present invention, the user can capture an image from any operating mode through the use of the shutter button 418 (FIG. 5).

Figure 9:
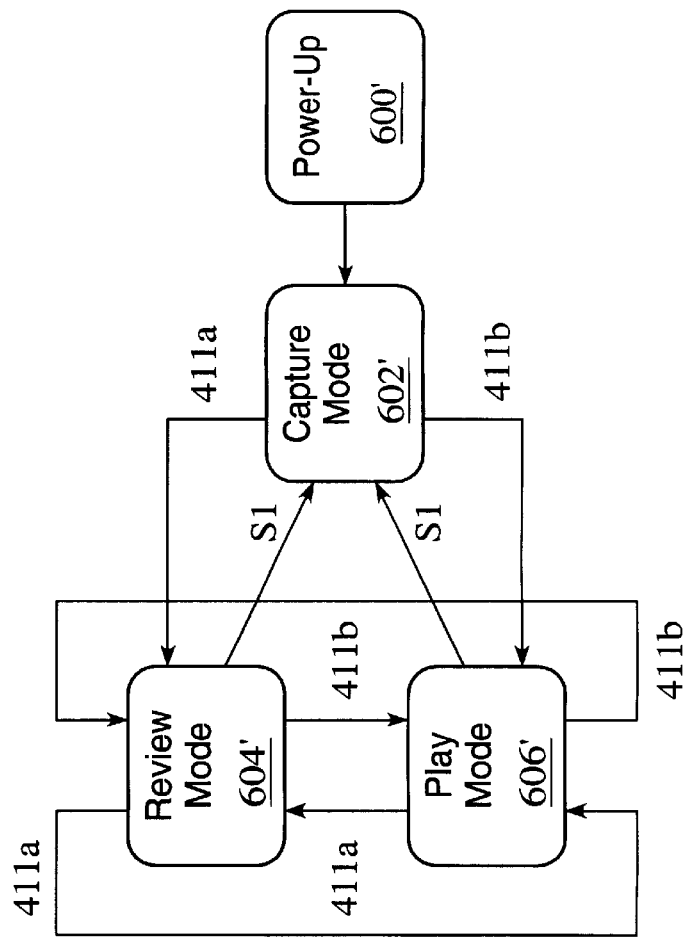
FIG. 9 is a state diagram of a method for changing operating modes of a digital camera in a second embodiment of the present invention.

Referring now to FIG. 9, a state diagram of a method for changing operating modes of a digital camera is shown that allows a user to capture an image from any operating mode. As in the first embodiment, when the camera is initially powered in block 600', the camera defaults to the capture mode 602'. Pressing the up button 411*a* on the four-way controller 409 causes the camera to switch to review mode 604', and pressing the down button 411*b* causes the camera to switch to play mode 606'. Pressing either the up button 411*a* or the down button 411*b* while in review mode 604' causes the camera to switch to the play mode 606'. And pressing either the up button 411*a* or the down button 411*b* while in play mode 606' causes the camera to switch to the review mode 604'.

Referring to FIGS. 5 and 9, while the camera is in either the review mode 604' or play mode 606', the user may capture an image by pressing the shutter button 418. In a preferred embodiment, the shutter button 418 is a two position button. The first position, S1, is an intermediate position, and the second position, S2, causes the camera to capture the image of whatever object 112 is shown through the camera's imaging device 114. According to the present invention, if the camera is in either the review mode 604' or play mode 606', the camera automatically switches to the capture mode when the user presses the shutter button 418 into the S1 position. The user is then free to capture the image shown on the LCD 402 by pressing the shutter button 418 into the S2 position. After capturing the image, the user can return the camera to review mode 604' or play mode 606' by pressing one of the vertical navigation buttons 411.

An improved method and apparatus for changing operating modes of an image capture device have been disclosed which make mode changes less cumbersome, reduce button clutter on the user interface, and reduce the amount of key sequences the user must memorize in order to effectively operate the digital camera.

Although the present invention has been described in accordance with the embodiments shown, one of ordinary skill in the art will readily recognize that there could be variations to the embodiments and those variations would be within the spirit and scope of the present invention. For example, the method and system may be implemented in image capture devices having only two modes, but that have multiple navigation screens within the "play mode" Accordingly, many modifications may be made by one of ordinary skill in the art without departing from the spirit and scope of the appended claims.

What is claimed is:

1. A method for changing operating modes in an image capture device having a capture mode for capturing images using a shutter button, and a second mode for displaying captured images on a display, the method comprising the steps of:
   a) providing the image capture device with a first set of navigational control buttons and a second set of navigational control buttons;
   b) providing the image capture device with a third mode for displaying the captured images on the display in a format different from the second mode;
   c) mapping a direction of image scrolling on the display device to the first set of navigational control buttons;
   d) switching between the capture mode, and the second and third modes in response to one press of the second set of navigational control buttons; and
   e) switching from the second and third modes to the capture mode when the shutter button is pressed to allow a user to capture an image from both the capture mode and the second and third modes.

2. The method of claim 1 wherein the first set of navigational control buttons have a horizontal orientation, and the second set of navigational control buttons have a vertical orientation.

3. The method of claim 2 further including the steps of providing the first set of navigational controls buttons with a left direction button and a right direction button, and providing the second set of navigational control buttons with an up direction button and a down direction button.

4. A method for changing operating modes of an image capture device having a navigational control button having a first set of direction buttons and a second set of direction buttons, the method comprising the steps of:
   a) capturing image data in a first operating mode and storing the image data as captured images;

b) displaying the captured images on a display in the second operating mode;

c) displaying the captured images on the display in a third operating mode in a different format than in the second operating mode;

d) controlling a direction of image scrolling in the third operating mode using the first set of direction buttons; and e) switching between the first operating mode and the second and third operating modes in response to one press of the second set of direction buttons.

5. The method of claim 4 wherein the image capture device includes a shutter button for capturing images, the method including the step of:

e) switching from the second mode to the first mode when the shutter button pressed, thereby allowing a user to capture an image from both the first and second operating modes.

6. The method of claim 5 wherein the first set of navigational controls buttons have a horizontal orientation, and the second set of navigational control buttons have a vertical orientation.

7. The method of claim 6 further including the steps of providing the first set of national controls buttons with a left direction button and a right direction button, and providing the second set of navigational control buttons with an up direction button and a down direction button.

8. An image capture device comprising:

an imaging device for capturing image data during capture mode;

a memory coupled to the imaging device for storing the image data as captured images;

a display;

a processor coupled to the imaging device and to the memory for controlling operation of the image capture device and for operating the image device during the capture mode and at least two display modes that display captured images on the display, the display modes including a play mode and a review mode, wherein the review mode displays captured images in a different format than in the play mode; and a four-way control button for controlling image scrolling on the display during one of the at least two display modes and for switching between the capture mode and the at least two display modes of the image capture device.

9. An image capture device as in claim 8 wherein the image capture device further includes a shutter button, wherein the processor functions to switch the image capture device from both play mode and review mode to the capture mode when the shutter button is pressed.

10. An image capture device as in claim 9 wherein the four-way control button includes a set of horizontal buttons, and a set of vertical buttons.

11. An image capture device as in claim 10 wherein the set of horizontal buttons control image scrolling in the review mode and the play mode, and the set of vertical buttons switch the operating modes of the image capture device.

* * * * *